United States Patent Office 3,476,443
Patented Nov. 4, 1969

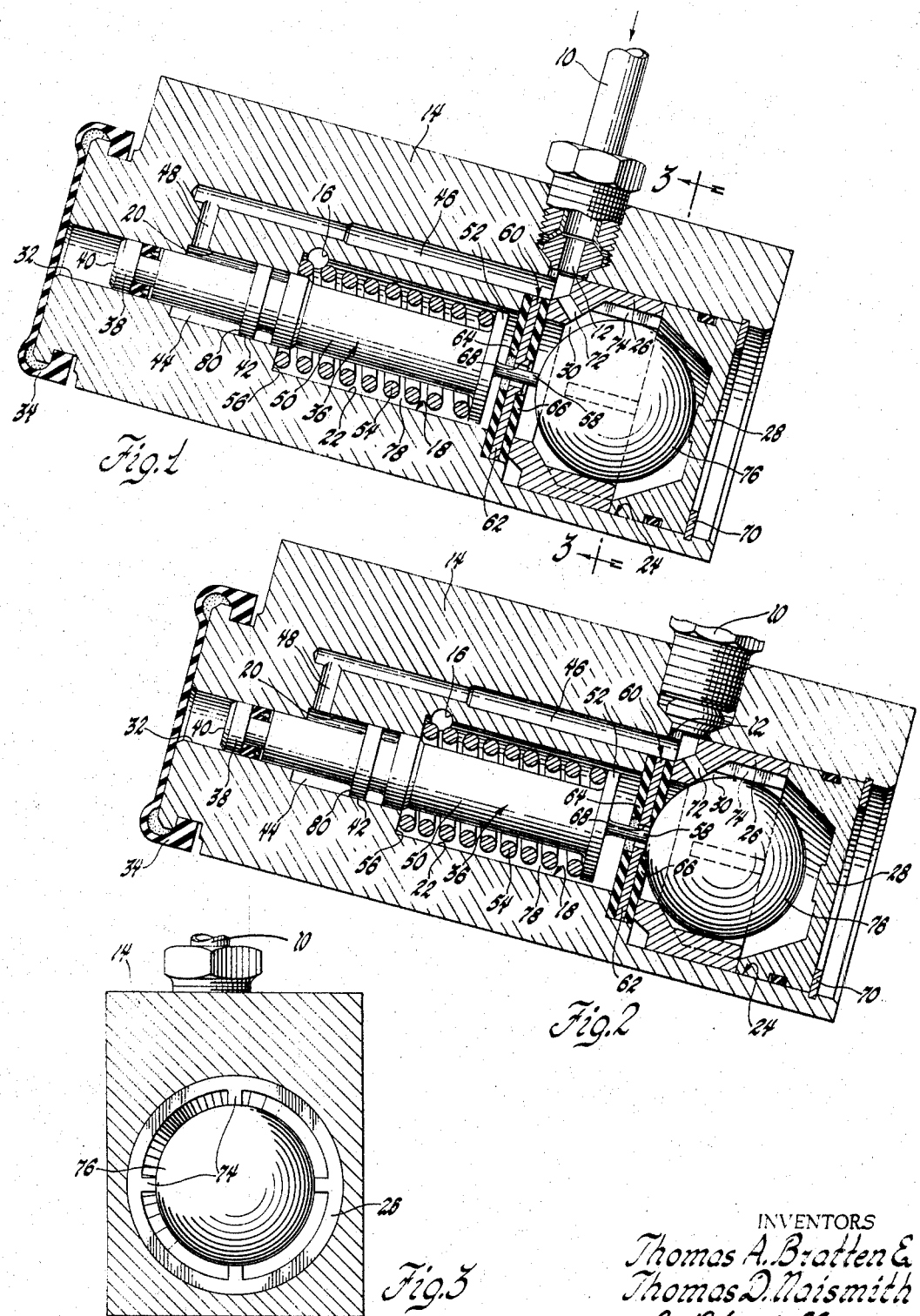

3,476,443
INERTIA SENSING PROPORTIONER
Thomas A. Bratten, Dayton, and Thomas D. Naismith, Centerville, Ohio, assignors to General Motors Corporation, Detroit, Mich., a corporation of Delaware
Filed Aug. 2, 1968, Ser. No. 749,636
Int. Cl. B60t 8/18
U.S. Cl. 303—24                 3 Claims

ABSTRACT OF THE DISCLOSURE

A brake line pressure proportioning device which, after a preselected vehicle deceleration is reached, provides reduced line pressure to one of two sets of brakes, such reduction being according to a preselected reduction ratio, the fluid output of such device being limited only by the fluid input, and the ratio of output pressure to input pressure being selected to approximate the varying front-to-rear brake pressure ratio desired for optimum brake performance.

Cross reference to related application

The proportioner which embodies the invention herein disclosed and claimed is a modification of the brake line pressure proportioning device disclosed and claimed in copending application Ser. No. 750,142 filed on Aug. 5, 1968 and assigned to the common assignee by the inventor, Thomas A. Bratten.

Specification

The invention relates to a hydraulic pressure control valve assembly for use in a motor vehicle hydraulic brake system and more particularly to such a valve assembly which provides an output pressure different from the input pressure in such a manner that, with proper selection of parameters, improved braking can be achieved. The principle involved is one of reducing the rear brake hydraulic pressure with reference to the front brake hydraulic pressure in such a manner that the ratio of front-to-rear brake hydraulic pressure is approximately equal to the ratio of effective vehicle weight on the front and rear wheels as this ratio varies with the deceleration of the vehicle.

Brake pressure proportioners and controllers have been proposed and utilized which provide two-stage application of pressure to the rear brakes. During the first stage, the pressure applied to the rear brakes is the same as that applied to the front brakes. At some point there is a change after which the rear brake pressure is not the same as the front brake pressure. The manner in which this change is accomplished and the operation of the devices thereafter are the major differences between various devices. Some devices determine the changeover point by a preload on a spring. The changeover point thus occurs at a particular preselected input pressure. This will not insure that the brake pressure ratio consistently approximates the dynamic weight ratio since the dynamic weight ratio of a particular vehicle is determined by the deceleration of that vehicle. A given brake line pressure does not always result in a given vehicle deceleration due to changes in vehicle loading, changes in the coefficient of friction of the road surfaces encountered at various times, and changes in the forces required to be applied to the brake shoes in order to obtain a predetermined vehicle deceleration. In some devices found in the prior art, the rear brake pressure does not continue to increase after the changeover point is passed, even though the braking effort required of the rear vehicle wheels continues to increase. In other devices the increase of rear brake pressure does not begin immediately after the changeover point occurs since the pressure increase obtained before the changeover point preloads the device so that the preload must be dissipated after the changeover point before further increase in rear brake pressure. Other devices in the prior art do not permit unlimited fluid flow therethrough while operating in the proportioning mode.

The invention herein disclosed and claimed proportions brake line pressure to one set of vehicle wheel brakes, usually the rear wheel brakes, after a preselected vehicle deceleration is reached. The proportioning is accomplished by reducing rear brake pressure at a preselected ratio of front brake pressure as applied from the master cylinder, while providing fluid output limited only by the fluid input. Brake pressure proportioning occurs immediately upon reaching the changeover point so that a continued increase in input pressure results in a continued increase in output pressure at the preselected reduction ratio. The proportioner of the above-identified application utilized two valves and a more complicated piston structure, while the proportioner herein described and claimed uses one valve which is closed by vehicle deceleration and is also controlled by the pressures to meter fluid under pressure from the inlet to the outlet at the desired pressure ratio.

In the drawing:

FIGURE 1 is a cross section view of the proportioner embodying the invention and showing the proportioner mechanism in the position in which no proportioning action takes place;

FIGURE 2 is similar to FIGURE 1 and shows the proportioning mechanism in the position in which sufficient vehicle deceleration has occurred to actuate the proportioner; and FIGURE 3 is a cross section view of the proportioner taken in the direction of arrows 3—3 of FIGURE 1.

When the proportioner is utilized in a vehicle brake system a brake conduit from the master cylinder is connected by pipe 10 to the inlet 12 provided in the proportioner housing or body 14. A fluid outlet 16 is also provided in the housing 14 and is adapted to be connected to a set of vehicle brakes. As more completely disclosed in the above-identified application, a brake system in which the proportioner is particularly useful is one in which the front brakes are disc brakes and the rear brakes are drum brakes. The proportioner is positioned in the rear brake circuit intermediate the master cylinder and the rear brakes so that the hydraulic pressure delivered to the rear brakes can be proportioned at a predetermined ratio to the pressure delivered to the front brakes when sufficient vehicle deceleration occurs to make this desirable. The proportioner is illustrated in FIGURES 1 and 2 as being positioned at a predetermined angle from the horizontal, and the mounting arrangement may be adjustable.

The housing 14 has a stepped diameter bore 18 with the fluid inlet 12 communicating with a first bore section 20 and the fluid outlet 16 communcating with a second bore section 22. A third bore section 24 has a valve guide 26 and a bore end closure member 28 received therein to provide a valve chamber 30 in the third bore section. A fourth bore section 32 at the other end of the bore from the third bore section is open to atmospheric pressure, with the dust cap 34 preventing contamination of the bore.

A stepped diameter piston 36 is reciprocably received in the bore 18. The small diameter end 38 of piston 36 fits within the fourth bore section 32 so that the piston end surface 40 is subjected to atmospheric pressure. A larger diameter piston section 42 is within the first bore section 20 and cooperates therewith to define the inlet pressure chamber 44. This chamber is connected in full fluid communication with the inlet 12 by passages 46 and 48 formed in housing 14. The piston section 50 received within the second bore section 22 is provided near one end with an enlarged flange 52 which acts as a seat for spring 54. The other end of spring 54 engages the bore shoulder 56 so that the spring urges the piston 36 to the right, as seen in the drawing. The right end of piston 36 has a small diameter pin 58 extending into the third bore section 24. A valve seat assembly 60 is mounted in the housing 14 and separates the second and third bore sections. This assembly is annular in form and the piston pin 58 extends through the center of the seat with sufficient radial clearance to permit full fluid communication between the second and third bore sections. The valve seat assembly is made up of a disc 62 with a rubber-like ring 64 on the side of the disc facing the second bore section and a similar ring 66 on the side of the disc facing the third bore section. The opening 68 of the valve seat assembly 60 into which pin 58 extends connects with the valve chamber 30 through the annular end of the valve guide 26. As can be seen in the drawing, the valve guide 26 holds the valve seat assembly in place when the end closure member 28 is secured in place by suitable means such as the snap ring 70. The valve guide 26 has a passage 72 fully connecting the inlet 12 and the valve chamber 30 so that fluid under inlet pressure is provided in the valve chamber 30 at all times. The valve guide 26 has several longitudinally extending lands 74 which guide the valve member 76 in axial movement. The valve member 76 is illustrated as being a ball type valve which is somewhat smaller in diameter than the length of the valve chamber 30 so that when the ball is in its rest position it engages the end closure member 28 and rests on one or more of the lands 74 and is sufficient spaced relation to the valve seat assembly ring 66 to permit free fluid communication between the valve chamber 30 and the outlet chamber 48 formed by the second bore section 22 and the piston 36.

In the normal operating position of the vehicle in which the proportioner is installed, the left end of the device as shown in the drawing would be in the forward direction of vehicle movement and would be tilted upwardly at some moderate angle. This angle would be adjustable and may be on the order of 15° from the horizontal in such a position that the ball valve member 76 will remain in the home or rest position shown in FIGURE 1 by virtue of its own weight. Also, assuming a preload on the spring 54, piston 36 will be held to the right as shown in FIGURE 1 so that pin 58 engages the ball valve member 76 and assists in holding the valve member in this position.

In the operation of the device, brake fluid is contained in all of the passages, bore sections, and chambers except for that portion of the bore opening to atmosphere at bore section 32. When the vehicle brakes are applied, brake fluid under pressure is received through pipe 10 into inlet 12 and is communicated to inlet pressure chamber 44, valve chamber 30, and outlet chamber 78. The necessary volume of fluid to permit brake displacement is delivered from the inlet 12 through the valve chamber 30, opening 68 and outlet chamber 78 to the outlet port 16 and thence to the set of brakes connected therewith. Inlet pressure acts on an effective area of the piston 36 exposed to chamber 78 to urge the piston to the left against spring 54. Inlet pressure also acts on the annular surface 80 of the larger diameter piston section 42, urging the piston to the right as seen in FIGURE 1. Atmospheric pressure acts on the piston end surface 40. The areas of end surface 40 and annular surface 80 together are substantially equal to the effective area of piston 36 exposed to chamber 78. As the inlet pressure increases, the unbalanced forces generated on the piston cause the piston to move leftwardly against spring 54. If the spring 54 is preloaded as above described, the spring preload must be overcome before leftward movement of the piston occurs. It is desirable to select the spring preload and the spring rate so that the force required to compress spring 54 with leftward movement of the piston is such that the pressure required to cause the piston to move to the left to the point where the piston pin 58 will allow the valve member 76 to close against the valve seat assembly 60 is a pressure less than that which will generate sufficient vehicle deceleration by actuation of the brakes to cause the valve member 76 to close the seat opening 68. When the piston 36 moves to the left to this extent before valve member 76 closes, the leftward movement of the piston will cause a net increase in the volume of the brake system connected to outlet 16 and therefore an effective loss of fluid from that displaced by the master cylinder. This loss is only momentary, however, and is compensated for by slightly additional master cylinder displacement. The loss may also be regained after the valve 76 closes. Until there is sufficient vehicle deceleration obtained to move the valve member 76 up the ramp formed by the valve guide lands 74, there is free hydraulic fluid flow and pressure communication between the inlet 12 and the outlet 16. Therefore the fluid pressure delivered from the master cylinder to the pipe 10 will be delivered to the set of brakes connected with the proportioner outlet 16.

When sufficient vehicle deceleration is obtained, the inertia of the valve member 76 will cause it to move until it engages the valve seat assembly 60 and closes opening 68. At this point there will no longer be free communication between the inlet 12 and the outlet 16. Further increase in inlet pressure generated in the master cylinder and delivered to pipe 10 will increase the pressure in valve chamber 30, tending to hold the valve member 76 against the valve seat assembly 60, and will also increase the pressure in inlet pressure chamber 44 acting on the annular surface 80 of the piston section 42. This increased pressure acting on the piston will occur with a corresponding increase in the pressure in outlet chamber 78. It is desirable that the characteristics of spring 54 be such that the pressure increase encountered before valve member 76 closes does not move piston 36 the full amount of its allowed travel to the left so that the piston will not bottom out either directly or through spring 54 and preload directly against the housing 14. This will prevent the necessity of further increase in inlet pressure without a corresponding increase in outlet pressure until such preload is overcome. When the piston has not bottomed out, the increase in inlet pressure in chamber 44 after the closure of valve member 76 will move the piston rightwardly. This has the effect of decreasing the volume of outlet chamber 78 while increasing the volume of chamber 44 at a lesser rate, therefore increasing pressure in the outlet 16, and recouping the earlier-mentioned volume loss. The pressure increase in outlet chamber 78 will be at a ratio to the inlet pressure increase established by the ratio of the area of surface 80 to the effective area of the piston exposed to outlet pressure chamber 78. As the piston 36 approaches its home position the pin 58 will engage the valve member 76. Additional increase in inlet pressure will cause the piston to exert force on the valve member and the valve member will tend to be lifted off the valve seat assembly 60. When slight lifting has occurred, fluid in the valve chamber 30 under inlet pressure will be metered past the valve member 76 through the opening 68 into the outlet chamber 78, thus causing the pressure in that chamber to increase. This increase in outlet chamber pressure will be transmitted to the brakes connected with outlet 16 and will also tend to balance the force caused by the pressure in chamber 44, thereby causing the piston to move slightly leftward and preventing further fluid from leaking past the valve member. Thus as inlet pressure increases it will be metered in a controlled manner to the outlet so that proportioned outlet pressure will still be provided. The ratio of inlet pressure to outlet pressure is so selected as to be approximately proportional to the ratio of effective vehicle weight on the front and rear vehicle wheels as this ratio varies with the deceleration of the vehicle.

When the vehicle brakes are to be released, the inlet pressure is reduced. Therefore the pressure in outlet chamber 78 will be greater than that required to balance piston 36 and the piston will be moved to the left. By such movement, the pressure in chamber 78 will be reduced in a manner proportional to the inlet pressure and in essentially the same proportion as the earlier pressure increase. This process will continue until the inlet and outlet pressures are substantially equal, at which time the valve member 76 will move under the influence of gravity away from the valve seat assembly 60 and the spring 54 will return the piston 36 to its home position shown in FIGURE 1. Valve member 76 will move rightwardly to its home position under the influence of gravity since the vehicle deceleration will become less, and also under the influence of the greater pressure in chamber 78 acting over the effective area of opening 68 while the valve is closed. Piston pin 58 will engage the valve member 76 in its home position and the movable parts of the entire device will tend to be held in place without rattling because of the preload on spring 54.

What is claimed is:

1. A hydraulic fluid pressure proportioner comprising:
   a housing having a stepped diameter bore, a fluid inlet communicating with a first bore section, a fluid outlet communicating with a second bore section, a third bore section including a valve chamber, and a fourth bore section subject to atmospheric pressure;
   a stepped diameter piston reciprocably received in said bore and cooperating therewith to define an inlet pressure chamber at said first bore section and an outlet chamber at said second bore section, said piston having one piston end formed to provide a pin extending into said third bore section and having the other piston end extending into said fourth bore section;
   an annular valve seat mounted in said housing and separating said second and third bore sections with said piston pin extending therethrough;
   a deceleration responsive valve member in said valve chamber and movable to engage and disengage said valve seat to disconnect and connect said valve chamber and said outlet chamber in a fluid controlling mode;
   passage means in said housing fluid connecting said fluid inlet with said inlet pressure chamber and said valve chamber;
   and spring means urging said piston toward said valve seat and tending to extend said piston pin further through said valve seat and into engagement with said valve member;
   the effective area of said piston exposed to outlet chamber pressure urging said piston against the action of said spring means being substantially equal and opposed to the combined effective areas of said piston respectively exposed to atmospheric pressure at said fourth bore section and fluid pressure in said inlet pressure chamber.

2. The proportioner of claim 1, said spring means being preloaded to hold said piston pin into engagement with said valve member and to hold said valve member away from said valve seat, the amount of preload and the spring rate being so selected that the pressure required to move said piston to withdraw said piston pin sufficiently to permit said valve member to engage said valve seat is less than that existent when deceleration moves said valve member to engage said valve seat.

3. The proportioner of claim 2, said spring means preload and spring rate also being so selected that the pressure required to move said piston the maximum available distance in the pin withdrawal direction is greater than the pressure existent when deceleration moves said valve member to engage said valve seat.

References Cited

UNITED STATES PATENTS

| 3,147,046 | 9/1964 | Stelzer | 303—6 X |
| 3,317,251 | 5/1967 | Hambling et al. | 303—6 X |
| 3,383,139 | 5/1968 | Chevreux | 303—6 |
| 3,385,308 | 5/1968 | Farr | 303—6 |

MILTON BUCHLER, Primary Examiner

JOHN J. McLAUGHLIN, Jr., Assistant Examiner

U.S. Cl. X.R.

137—38; 188—152; 303—6